(12) United States Patent
Hong et al.

(10) Patent No.: US 11,992,810 B2
(45) Date of Patent: May 28, 2024

(54) METHOD OF DETECTING DEFECTS IN SEPARATION MEMBRANE ELEMENT AND APPARATUS FOR DETECTING DEFECTS IN SEPARATION MEMBRANE ELEMENT

(71) Applicant: LG CHEM, LTD., Seoul (KR)

(72) Inventors: Ja Min Hong, Daejeon (KR);
Hyungjoon Jeon, Daejeon (KR);
Chong Kyu Shin, Daejeon (KR);
Byoungsoo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 590 days.

(21) Appl. No.: 17/270,109

(22) PCT Filed: Oct. 18, 2019

(86) PCT No.: PCT/KR2019/013745
§ 371 (c)(1),
(2) Date: Feb. 22, 2021

(87) PCT Pub. No.: WO2020/080880
PCT Pub. Date: Apr. 23, 2020

(65) Prior Publication Data
US 2021/0178332 A1    Jun. 17, 2021

(30) Foreign Application Priority Data

Oct. 18, 2018 (KR) ........................ 10-2018-0124585

(51) Int. Cl.
*B01D 65/10* (2006.01)
*B01D 63/10* (2006.01)
*B01D 71/56* (2006.01)
*G01N 13/04* (2006.01)
*G01N 15/08* (2006.01)

(52) U.S. Cl.
CPC ........... *B01D 65/102* (2013.01); *B01D 63/10* (2013.01); *B01D 65/10* (2013.01); *B01D 71/56* (2013.01); *G01N 13/04* (2013.01); *G01N 15/0806* (2013.01); *B01D 2325/20* (2013.01); *G01N 2015/084* (2013.01)

(58) Field of Classification Search
CPC ...... B01D 63/04; B01D 61/025; B01D 71/56; B01D 63/10; B01D 65/109; G01D 65/10; G01N 2015/084; G01N 2015/0662; G01N 15/0806
See application file for complete search history.

(56) References Cited

U.S. PATENT DOCUMENTS 4,614,109 A * 9/1986 Hofmann ............. B01D 65/102 73/38
4,888,116 A * 12/1989 Cadotte ................ B01D 69/125 210/636

(Continued)

FOREIGN PATENT DOCUMENTS

CN    104661732    5/2015
CN    108452683    8/2018
(Continued)

*Primary Examiner* — Tran M. Tran
(74) *Attorney, Agent, or Firm* — BRYAN CAVE LEIGHTON PAISNER LLP

(57) ABSTRACT

Provided is a method for detecting defects of a separation membrane element, and an apparatus for detecting defects of a separation membrane element.

5 Claims, 3 Drawing Sheets

(56) References Cited

U.S. PATENT DOCUMENTS

| | | | | |
|---|---|---|---|---|
| 5,064,529 | A * | 11/1991 | Hirayama | B01D 65/102 73/38 |
| 5,154,832 | A * | 10/1992 | Yamamura | B01D 63/10 210/321.74 |
| 6,324,898 | B1 * | 12/2001 | Cote | G01N 15/0826 210/90 |
| 6,463,790 | B1 * | 10/2002 | Chun | G01N 15/0826 73/61.73 |
| 6,543,275 | B2 * | 4/2003 | Wu | G01N 15/0826 73/159 |
| 6,907,770 | B2 * | 6/2005 | Von Der Hardt | G01N 15/0826 73/40 |
| 6,983,504 | B2 * | 1/2006 | Grummert | B01D 65/104 73/38 |
| 7,698,928 | B2 * | 4/2010 | Jons | B01D 63/12 73/38 |
| 8,025,159 | B2 * | 9/2011 | Kawakatsu | B01D 69/02 427/407.1 |
| 8,272,251 | B2 * | 9/2012 | Jons | B01D 63/12 73/53.01 |
| 8,348,499 | B2 * | 1/2013 | Jons | B01D 63/10 374/112 |
| 8,354,029 | B2 * | 1/2013 | Hank | B01D 61/12 210/741 |
| 8,562,803 | B2 * | 10/2013 | Nyberg | C02F 1/4695 204/632 |
| 8,571,296 | B2 | 10/2013 | Jons | |
| 8,596,110 | B2 * | 12/2013 | Rahman | G01N 13/04 73/38 |
| 8,778,056 | B2 | 7/2014 | Uchikawa et al. | |
| 8,881,600 | B2 * | 11/2014 | Puppini | A61M 1/3413 604/4.01 |
| 8,991,235 | B2 * | 3/2015 | Jons | B01D 65/102 73/38 |
| 9,090,493 | B2 * | 7/2015 | Nyberg | C02F 1/469 |
| 9,108,138 | B2 * | 8/2015 | Hao | B01D 46/2411 |
| 9,243,991 | B2 * | 1/2016 | Wagner | B01D 65/102 |
| 9,597,640 | B2 * | 3/2017 | Koiwa | B01D 69/12 |
| 9,610,541 | B2 * | 4/2017 | Hodgkinson | B01D 65/02 |
| 9,653,743 | B2 | 5/2017 | Ahn et al. | |
| 9,726,591 | B2 * | 8/2017 | Helle | B01D 65/102 |
| 9,764,291 | B2 * | 9/2017 | Hirozawa | B01D 63/10 |
| 9,902,634 | B2 * | 2/2018 | Friese | C02F 3/102 |
| 9,962,660 | B2 * | 5/2018 | Van Der Pluijm | B01D 71/64 |
| 10,092,880 | B2 * | 10/2018 | Okubo | B01D 53/228 |
| 10,350,551 | B2 * | 7/2019 | Armgart | G01N 15/0826 |
| 10,441,917 | B2 * | 10/2019 | Kitaura | B01D 69/142 |
| 10,525,414 | B2 * | 1/2020 | Kodama | B01D 69/1218 |
| 10,648,957 | B2 * | 5/2020 | Khusid | G01N 33/18 |
| 10,955,328 | B2 * | 3/2021 | Giglia | G01N 15/082 |
| 11,000,800 | B2 * | 5/2021 | Sato | B01D 69/1213 |
| 11,052,350 | B2 * | 7/2021 | Grausam | B01D 63/021 |
| 11,148,098 | B2 * | 10/2021 | Jons | B01D 63/12 |
| 11,167,249 | B2 * | 11/2021 | Koiwa | B32B 27/08 |
| 11,198,098 | B2 * | 12/2021 | Jons | B01D 63/106 |
| 11,214,500 | B2 * | 1/2022 | Jons | B01D 63/10 |
| 11,369,924 | B2 * | 6/2022 | Garg | C02F 1/44 |
| 11,383,208 | B2 * | 7/2022 | Takahashi | B01D 69/10 |
| 11,402,314 | B2 * | 8/2022 | Miyahara | G01N 15/0886 |
| 11,465,098 | B2 * | 10/2022 | Warsinger | C02F 1/441 |
| 11,534,719 | B1 * | 12/2022 | Lokare | B01D 67/0093 |
| 11,691,109 | B2 * | 7/2023 | Tasaki | B01D 65/003 96/12 |
| 11,692,922 | B2 * | 7/2023 | Huza | F24F 11/39 73/38 |
| 2004/0019438 | A1 | 1/2004 | Padgett et al. | |
| 2006/0144777 | A1 * | 7/2006 | Kumano | B01D 61/026 210/321.89 |
| 2008/0163698 | A1 * | 7/2008 | Ogawa | B01D 61/22 73/861 |
| 2009/0299651 | A1 | 12/2009 | Sadar | |
| 2011/0091094 | A1 | 4/2011 | Jons | |
| 2011/0170572 | A1 | 7/2011 | Jons et al. | |
| 2015/0041388 | A1 * | 2/2015 | Hirozawa | B01D 69/04 210/457 |
| 2015/0068963 | A1 * | 3/2015 | Yoo | B01D 69/12 427/244 |
| 2015/0151244 | A1 * | 6/2015 | Ishizuka | B01D 61/38 422/212 |
| 2015/0190755 | A1 | 7/2015 | Miyahara et al. | |
| 2015/0352501 | A1 * | 12/2015 | Ko | B01D 69/10 427/245 |
| 2018/0264410 | A1 * | 9/2018 | Taniguchi | B01D 61/025 |
| 2020/0047129 | A1 | 2/2020 | Tasaki et al. | |
| 2020/0215493 | A1 * | 7/2020 | Assmann | B01D 65/102 |
| 2023/0228665 | A1 * | 7/2023 | Hoeng | G01N 15/0806 73/38 |

FOREIGN PATENT DOCUMENTS

| | | |
|---|---|---|
| EP | 1300186 B1 | 2/2007 |
| EP | 1775015 A1 | 4/2007 |
| JP | 2006-231289 | 9/2006 |
| JP | 2007-007539 | 1/2007 |
| JP | 2013-034994 | 2/2013 |
| JP | 2013-508142 | 3/2013 |
| JP | 2015-186776 | 10/2015 |
| JP | 2018-114473 | 7/2018 |
| KR | 10-1999-0019008 | 3/1999 |
| KR | 10-2008-0038541 | 5/2008 |
| KR | 10-1567708 | 11/2015 |
| WO | 2018-186109 | 10/2018 |

\* cited by examiner

[FIG. 1]
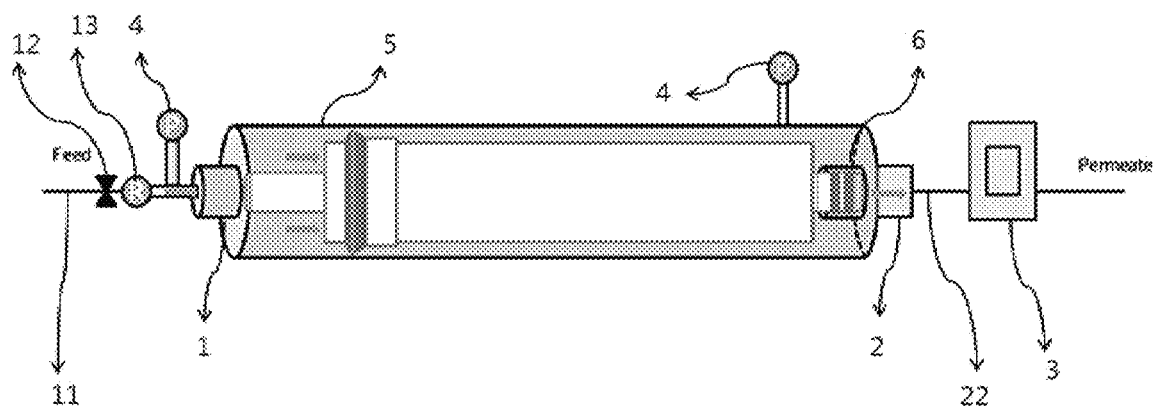
[FIG. 2]
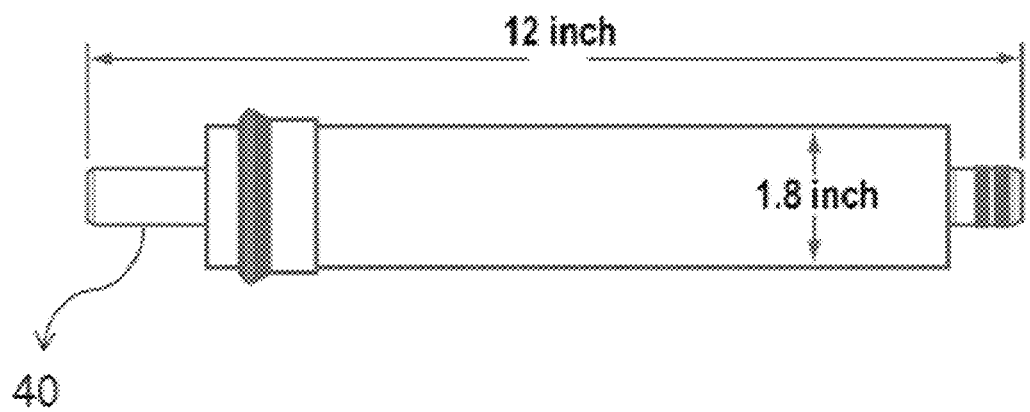

[FIG. 3]
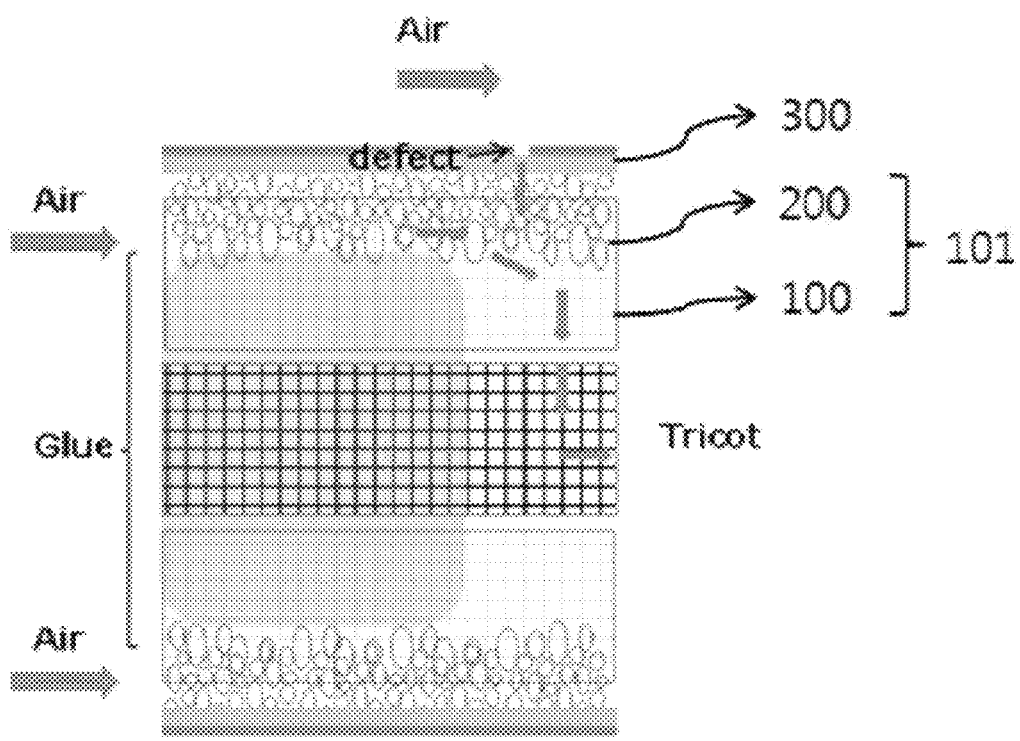

[FIG. 4]
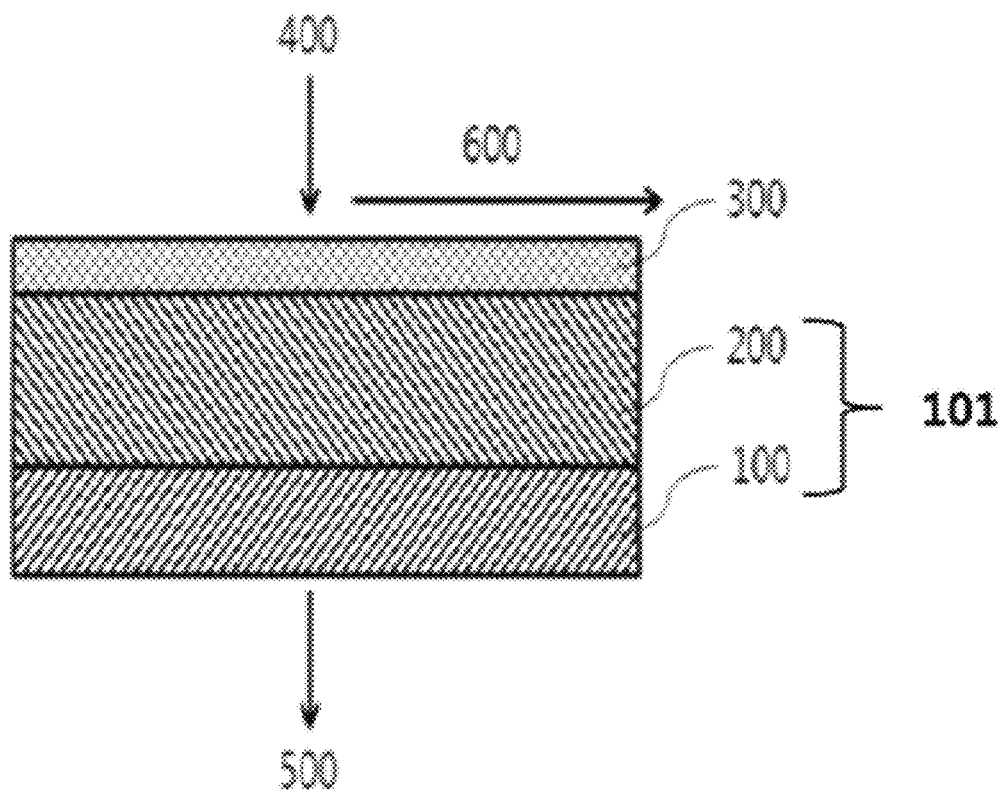
[FIG. 5]
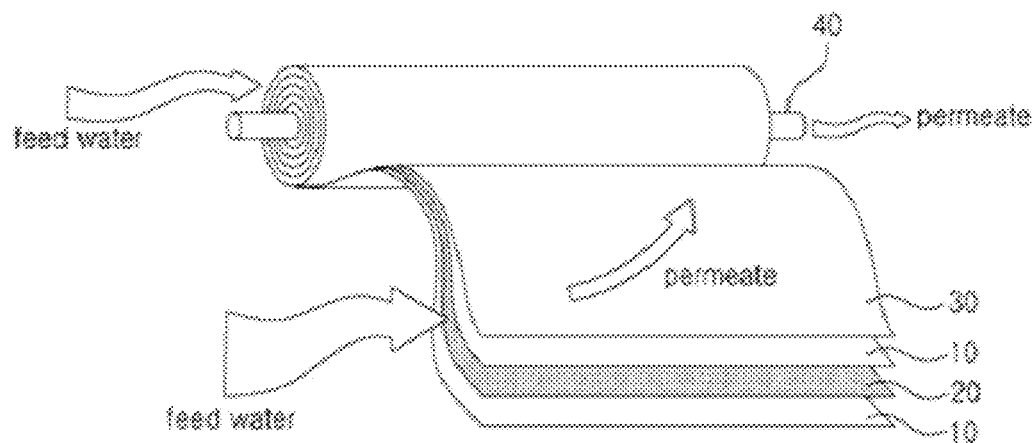

METHOD OF DETECTING DEFECTS IN SEPARATION MEMBRANE ELEMENT AND APPARATUS FOR DETECTING DEFECTS IN SEPARATION MEMBRANE ELEMENT

CROSS-REFERENCE TO RELATED APPLICATIONS

This application is a National Stage Application of International Application No. PCT/KR2019/013745 filed on Oct. 18, 2019, which claims priority to and the benefits of Korean Patent Application No. 10-2018-0124585, filed with the Korean Intellectual Property Office on Oct. 18, 2018, the entire contents of which are incorporated herein by reference.

TECHNICAL FIELD

The present specification relates to a method for detecting defects of a separation membrane element and an apparatus for detecting defects of a separation membrane element.

BACKGROUND

Separation membrane manufacturing and process technologies have been widely applied from simple laboratory scales to large scale industrial processes depending on manufacturing of high purity and high functional materials and social demands such as protecting the global environment.

Among these, water purification technology that is a technology for securing alternative water resources has received attention as water shortage resulting from global warming has become more serious worldwide. Accordingly, a water-treatment process using a reverse osmosis membrane, a core technology of next generation tap water business using alternative water resources such as seawater desalination or water reuse, is expected to lead the water industry market. Such reverse osmosis membrane permeated water by the reverse osmosis membrane becomes pure water or water close to infinitely pure water, and is used in various fields such as medical sterile water or purified water for dialysis, or water for manufacturing a semiconductor in the electronic industry.

In addition, a separation membrane has been widely used in the field of gas separation including hydrogen and oxygen, and the like.

BRIEF DESCRIPTION

Technical Problem

The present specification is directed to providing a method for detecting defects of a separation membrane element, and an apparatus for detecting defects of a separation membrane element.

Technical Solution

One embodiment of the present specification provides a method for detecting defects of a separation membrane element, the method comprising positioning the separation membrane element inside a pressure vessel; and supplying a gas to a gas supply unit of the pressure vessel and measuring permeability of the separation membrane element using the gas passing through the separation membrane element, wherein a separation membrane included in the separation membrane element comprises a porous layer and an active layer provided on the porous layer, the active layer is a polyamide active layer, and the separation membrane element is a spiral wound module.

Another embodiment of the present specification provides an apparatus for detecting defects of a separation membrane element, the apparatus comprising a pressure vessel comprising a gas supply unit and a gas discharge unit; and a measurement unit measuring permeability of the separation membrane element using a gas discharged to the gas discharge unit, wherein a separation membrane included in the separation membrane element comprises a porous layer and an active layer provided on the porous layer, the active layer is a polyamide active layer, and the separation membrane element is a spiral wound module.

Advantageous Effects

A method for detecting defects of a separation membrane element and an apparatus for detecting defects of a separation membrane element using gas permeability according to the present specification have advantages of being economical in terms of raw materials, energy and the like compared to detecting defects of a separation membrane element using brine.

DESCRIPTION OF THE DRAWINGS

FIG. 1 illustrates an apparatus for detecting defects of a separation membrane element according to one embodiment of the present specification.

FIG. 2 illustrates a separation membrane element according to one embodiment of the present specification.

FIG. 3 illustrates a separation membrane according to one embodiment of the present specification.

FIG. 4 illustrates a separation membrane according to one embodiment of the present specification.

FIG. 5 illustrates constituents of a separation membrane element according to one embodiment of the present specification.

DETAILED DESCRIPTION

In the present specification, a description of a certain member being placed "on" another member includes not only a case of the certain member being in contact with the another member but a case of still another member being present between the two members.

In the present specification, a description of a certain part "comprising" certain constituents means capable of further including other constituents, and does not exclude other constituents unless particularly stated on the contrary.

Hereinafter, the present specification will be described in more detail.

One embodiment of the present specification provides a method for detecting defects of a separation membrane element, the method comprising positioning the separation membrane element inside a pressure vessel; and supplying a gas to a gas supply unit of the pressure vessel and measuring permeability of the separation membrane element using the gas passing through the separation membrane element, wherein a separation membrane included in the separation membrane element comprises a porous layer and an active layer provided on the porous layer, the active layer is a polyamide active layer, and the separation membrane element is a spiral wound module.

In a separation membrane element, flux and salt rejection are important performance indicators of a separation membrane element product. Performance indicators of flux and salt rejection can be identified by directly evaluating a separation membrane element using brine, however, low salt rejection and high flux are obtained when defects occur in a manufacturing process of a separation membrane element. Determining the presence of defects by directly evaluating a separation membrane element using brine as above consumes many factors such as time, raw materials including brine, and energy. In addition, since it is impossible to re-dry the separation membrane element after evaluating with brine, there is a disadvantage in handling by an increase in the weight due to wetting, and the like.

Meanwhile, the method for detecting defects of a separation membrane element and the apparatus for detecting defects of a separation membrane element according to the present specification detect defects of a separation membrane element using gas permeability, and there are advantages in that they are economical compared to detecting defects using brine, and the separation membrane element is readily handled after evaluating defect detection since there is no weight increase caused by wetting.

In the present specification, the "defect" of the separation membrane element can be from being not sealed due to an adhesive failing to be coated partially, or tearing caused by physical damages during a process of assembling or processing the separation membrane element. In addition, it can mean physical damages on the separation membrane caused by friction between raw and subsidiary materials during a rolling process of the separation membrane element, however, the defect is not limited thereto.

In one embodiment of the present specification, the positioning of the separation membrane element inside a pressure vessel means introducing the separation membrane element into the pressure vessel, and fixing the separation membrane element inside the pressure vessel.

By fixing the separation membrane element inside the pressure vessel, permeability of the separation membrane element can be accurately measured.

The pressure vessel can be used without particular limit in the material as long as the vessel is capable of sealing the supplied gas and made of a material that is not corrosive. For example, stainless steel (SUS) can be used.

The pressure vessel can be cylindrical. When the pressure vessel is cylindrical, the pressure vessel size can vary depending on the size of the separation membrane element subject to defect detection. For example, a diameter of one cross section of the pressure vessel can be from 5 cm to 21 cm (2 inch to 8 inch), and the length can be from 30 cm to 102 cm (12 inch to 40 inch), however, the diameter and the length are not limited thereto.

In one embodiment of the present specification, supplying a gas to a supply unit of the pressure vessel in the supplying of a gas to a gas supply unit of the pressure vessel and the measuring of permeability of the separation membrane element using the gas passing through the separation membrane element means introducing a gas to the separation membrane element in the same manner as introducing raw water. Specifically, the separation membrane element comprises a center tube and a case, and the gas is supplied between the center tube and the case.

The gas supplied between the center tube and the case can be brought into contact with one side surface of the separation membrane. One side surface of the separation membrane means, when the separation membrane comprises a porous layer and an active layer provided on the porous layer, an opposite surface of the active layer rather than a surface that the porous layer and the active layer are brought into contact with each other.

When the supplied gas permeates the separation membrane after being brought into contact with one side surface of the separation membrane, the supplied gas can permeate in a direction not parallel to the one side surface of the separation membrane.

When the supplied gas permeates the separation membrane, the gas permeates the active layer, and then the porous layer in contact with the active layer. The gas permeating the porous layer is collected in the center tube through a tricot.

Measuring permeability of the separation membrane element after supplying a gas to a supply unit of the pressure vessel can be measuring permeability of the separation membrane element after 30 seconds to 60 seconds after supplying a gas to the supply unit.

The measuring of permeability of the separation membrane element using the gas passing through the separation membrane element includes measuring the permeability using a flow meter.

In the measuring of permeability of the separation membrane element in the method for detecting defects of a separation membrane element provided in one embodiment of the present specification, the pressure vessel comprises a gas discharge unit discharging the gas passing through the separation membrane element out of the pressure vessel, and permeability of the separation membrane element is measured using the gas discharged to the gas discharge unit.

In the measuring of permeability of the separation membrane element using the gas discharged to the gas discharge unit, the gas discharged to the gas discharge unit means only a gas introduced to the gas discharge unit after the gas permeates the separation membrane included in the separation membrane element and collected in the center tube. In other words, the gas discharged to the gas discharge unit does not means a gas not permeating the separation membrane included in the separation membrane element.

In one embodiment of the present specification, the separation membrane element of which defects are detected by the method for detecting defects of a separation membrane element comprises a center tube and a case, and the supplying of a gas to a gas supply unit of the pressure vessel is supplying between the center tube and the case.

As for the case, descriptions provided below can be applied.

In one embodiment of the present specification, the supplying of a gas to a supply unit of the pressure vessel is supplying a compressed gas of greater than or equal to 0.1 MPa (20 psi) and less than or equal to 0.7 MPa (100 psi). Preferably, the pressure of the compressed gas can be greater than or equal to 0.2 MPa and less than or equal to 0.6 MPa (greater than or equal to 30 psi and less than or equal to 80 psi), greater than or equal to 0.2 MPa and less than or equal to 0.48 MPa (greater than or equal to 30 psi and less than or equal to 70 psi), and more preferably greater than or equal to 0.25 MPa and less than or equal to 0.45 MPa (greater than or equal to 40 psi and less than or equal to 60 psi). According to one example, the pressure of the compressed gas can be 0.35 MPa (50 psi).

When the compressed gas supplied to the pressure vessel has a pressure satisfying the above-mentioned range, a permeability difference obtained from the presence or absence of defects is proper without damaging the separation membrane element caused by pressurization, and as a result, defects of the separation membrane element can be effectively detected.

The method for detecting defects of a separation membrane element provided in one embodiment of the present specification includes detecting defects of the separation membrane element when permeability of the separation membrane element measured using the gas passing through the separation membrane element is 0.095 L/min (95 ccm) or greater.

In the present specification, the "gas" means dry air in the atmosphere including nitrogen, oxygen, carbon dioxide and the like.

The "ccm" means cc per minute as a unit representing flux of a gas, and 1 ccm can be 1 mL/min, and can be 0.001 L/min.

Defects of the separation membrane element are detected when permeability of the separation membrane element is 0.095 L/min (95 ccm) or greater, and therefore, an upper limit thereof is not limited.

In one embodiment of the present specification, defects are not detected in the manufacturing process of the separation membrane element when the measured permeability of the separation membrane element is less than 0.095 L/min (95 ccm), and excellent performance is obtained when evaluated for salt rejection and flux.

In the present specification, the permeability can be measured at 20° C. to 25° C., room temperature, and preferably at 25° C.

In one embodiment of the present specification, the separation membrane element can have a moisture content of 1% to 3%.

The moisture content can be calculated by the following calculation formula.

⟨Calculation Formula⟩

$$\text{Moisture content}(\%) = \frac{\text{Weight of separation membrane before heating }(g) - \text{Weight of separation membrane after heating }(g)}{\text{Weight of separation membrane before heating }(g)} \times 100$$

In the calculation formula, the heating means heating the separation membrane for 1 minute and 30 seconds at a temperature of 100° C.

In one embodiment of the present specification, the separation membrane sample for measuring the moisture content can have an area of 30 cm² to 50 cm² and/or a weight of 0.3 g to 0.7 g, however, the area and the weight are not limited thereto.

The method for detecting defects of a separation membrane element provided in one embodiment of the present specification further comprises evaluating salt rejection of the separation membrane element under a condition of sodium chloride (NaCl) 250 g/L (250 ppm), 0.41 MPa (60 psi), 25° C. and 15% recovery.

The evaluating of salt rejection of the separation membrane element is detecting defects of the separation membrane element when the separation membrane element has salt rejection of 97% or less.

When the separation membrane element has salt rejection of greater than 97%, it can be identified that the separation membrane element has excellent salt rejection performance.

The method for detecting defects of a separation membrane element provided in one embodiment of the present specification further comprises evaluating flux of the separation membrane element under a condition of sodium chloride (NaCl) 250 g/L (250 ppm), 0.41 MPa (60 psi), 25° C. and 15% recovery.

The evaluating of flux of the separation membrane element is detecting defects of the separation membrane element when flux of the separation membrane element is 340 L/day (90 GPD) or greater.

When the flux of the separation membrane element is less than 340 L/day (90 GPD), flux of the separation membrane element is properly maintained, and the separation membrane element having excellent performance can be identified.

The "GPD" means gallon/day as a unit representing flux, and 1 GPD is approximately 3.8 L/day.

The detecting of defects of the separation membrane element in one embodiment of the present specification can be determined such that, when conducting any one of detecting defects through evaluating salt rejection of the separation membrane element and detecting defects through evaluating flux of the separation membrane element, defects are detected in the separation membrane element when target salt rejection and/or flux are not satisfied in the present specification.

Another embodiment of the present specification provides an apparatus for detecting defects of a separation membrane element, the apparatus comprising a pressure vessel comprising a gas supply unit and a gas discharge unit; and a measurement unit measuring permeability of the separation membrane element using a gas discharged to the gas discharge unit, wherein a separation membrane included in the separation membrane element comprises a porous layer and an active layer provided on the porous layer, the active layer is a polyamide active layer, and the separation membrane element is a spiral wound module.

As for descriptions on the compressed gas supplied to the gas supply unit, the descriptions provided above can be applied.

In one embodiment of the present specification, the gas discharge unit is provided to discharge the gas out of the pressure vessel when the gas passing through the separation membrane element is discharged from one end of the separation membrane element.

In one embodiment of the present specification, the separation membrane element of which defects are detected by the apparatus for detecting defects of a separation membrane element comprises a center tube and a case, and the gas supply unit is provided so as to supply a gas between the center tube and the case.

In one embodiment of the present specification, the apparatus for detecting defects of a separation membrane element can further comprise a gas supply source, a supply line connected to a gas supply section between the gas supply source and the pressure vessel, and an on-off value installed on the supply line to supply or block the gas supplied from the gas supply source.

In addition, the apparatus for detecting defects of a separation membrane element can further comprise a pressure regulator installed on the supply line to regulate the pressure of the supplied gas, and a pressure gauge observing the pressure of the supplied gas.

As necessary, the apparatus for detecting defects of a separation membrane element can further comprise a pressure gauge installed in the pressure vessel. The pressure gauge installed in the pressure vessel is for comparing a difference from the pressure of the gas supplied through the supply unit.

In one embodiment of the present specification, the apparatus for detecting defects of a separation membrane element can further comprise a discharge line connected between the pressure vessel and a flow meter.

In one embodiment of the present specification, the measurement unit comprises a flow meter measuring permeability of the gas discharged to the gas discharge unit. In other words, the measurement unit can mean a flow meter.

The flow meter can generate a potential difference corresponding to a permeation rate by directly sensing the permeation rate.

As the flow meter, a bubble flow meter can be used. As the permeability of the separation membrane element, permeability is measured a total of 5 times using the bubble flow meter by applying a pressure of 0.35 MPa (50 psi) to the separation membrane element for a time of 3 minutes to 5 minutes under a condition of room temperature (25° C.) and 1 atm (101,325 Pa), and an average value thereof can be measured through calculation.

The apparatus for detecting defects of a separation membrane element can further comprise, as necessary, a fixing unit fixing the separation membrane element inside the pressure vessel.

The fixing unit can be employed without limit in the shape or size as long as it is capable of fixing the separation membrane element inside the pressure vessel so that the separation membrane element does not move.

The fixing unit can further comprise a sealing unit preventing the gas discharged from the center tube included in the separation membrane element from being leaked and discharged by being connected to the gas discharge unit.

By comprising the sealing unit, cracks or micro gaps can be prevented in the apparatus for detecting defects of a separation membrane element.

The sealing unit can include an O-ring, but is not limited thereto.

In one embodiment of the present specification, the separation membrane element is manufactured not to have a pressure decrease caused by an increase in the volume when supplying the gas to generate gas permeation.

In one embodiment of the present specification, the separation membrane included in the separation membrane element can be a water-treatment membrane. The water-treatment membrane can be used as a microfiltration membrane, an ultrafiltration membrane, a nanofiltration membrane, a reverse osmosis membrane or the like, and can be preferably used as a reverse osmosis membrane.

In one embodiment of the present specification, the separation membrane comprises a porous layer and an active layer provided on the porous layer.

The porous layer can comprise a first porous support and a second porous support.

As the first porous support, a non-woven fabric can be used. As a material of the non-woven fabric, polyethylene terephthalate can be used, however, the material is not limited thereto.

The non-woven fabric can have a thickness of 50 μm to 150 μm, however, the thickness is not limited thereto. The thickness can be preferably from 80 μm to 120 μm. When the non-woven fabric thickness satisfies the above-mentioned range, durability of the separation membrane comprising the porous layer can be maintained.

The second porous support can mean forming a coating layer made of a polymer material on the first porous support. Examples of the polymer material can include polysulfone, polyethersulfone, polycarbonate, polyethylene oxide, polyimide, polyetherimide, polyetheretherketone, polypropylene, polymethylpentene, polymethyl chloride, polyvinylidene fluoride and the like, but are not limited thereto. Specifically, polysulfone can be used as the polymer material.

The second porous support can have a thickness of 20 μm to 100 μm, however, the thickness is not limited thereto. The thickness can be preferably from 40 μm to 80 μm. When the coating layer thickness satisfies the above-mentioned range, durability of the separation membrane comprising the porous layer comprising the second porous support can be properly maintained.

According to one embodiment, the second porous support layer can be prepared using a polymer solution comprising the polysulfone. The polysulfone-comprising polymer solution can be a homogeneous liquid obtained by introducing 10% by weight to 20% by weight of a polysulfone solid to 80% by weight to 90% by weight of a dimethylformamide solvent based on the total weight of the polysulfone-comprising polymer solution, and dissolving the solid for 12 hours at 80° C. to 85° C., however, the weight range is not limited to the above-mentioned range.

When the polysulfone solid is included in the above-mentioned range based on the total weight of the polysulfone-comprising polymer solution, durability of the separation membrane comprising the second porous support can be properly maintained.

The second porous support can be formed using a method of casting. The casting means a solution casting method, and specifically, can mean a method of dissolving the polymer material in a solvent, developing the solution on a smooth surface with no adhesive property, and then substituting the solvent. Specifically, the method of substituting the solvent can use a nonsolvent induced phase separation method. The nonsolvent induced phase separation method is a method in which a polymer is dissolved in a solvent to form a homogeneous solution, and after forming the solution to a certain foam, this is dipped in a nonsolvent. After that, exchange occurs by the diffusion of the nonsolvent and the solvent changing the composition of the polymer solution, and as the polymer precipitates, the parts occupied by the solvent and the nonsolvent is formed to pores.

The active layer can be a polyamide active layer.

The polyamide active layer can be formed by producing polyamide by interfacial polymerization while an amine compound and an acyl halide compound react when the amine compound and the acyl halide compound are in contact with each other, and the polyamide being adsorbed on the porous layer. The contact can be made through methods such as dipping, spraying or coating. As a condition for the interfacial polymerization, those known in the art can be used without limit.

In order to form the polyamide active layer, an aqueous solution layer comprising an amine compound can be fainted on the porous layer. A method for forming the amine compound-comprising aqueous solution layer on the porous layer is not particularly limited, and methods capable of forming an aqueous solution layer on the porous layer can be used without limit. Specifically, a method for forming the amine compound-comprising aqueous solution layer on the porous layer can include spraying, coating, dipping, dropping or the like.

Herein, the amine compound-comprising aqueous solution layer can further go through removing an excess amine compound-comprising aqueous solution as necessary. The amine compound-comprising aqueous solution layer formed on the porous layer can be non-uniformly distributed when there are too much of the amine compound-comprising aqueous solution present on the porous layer, and when the amine compound-comprising aqueous solution is non-uniformly distributed, a non-uniform polyamide active layer can be formed by subsequent interfacial polymerization. Accordingly, the excess aqueous solution is preferably removed after forming the amine compound-comprising aqueous solution layer on the porous layer. A method of removing the excess aqueous solution is not particularly limited, however, methods using a sponge, an air knife, nitrogen gas blowing, natural drying, a compression roll or the like can be used.

In the amine compound-comprising aqueous solution, the amine compound is not limited in the type as long as it is an amine compound used in separation membrane manufacturing, however, specific examples thereof can preferably include m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine or mixtures thereof.

A solvent of the amine compound-comprising aqueous solution can be water, and in addition thereto, acetone, dimethyl sulfoxide (DMSO), 1-methyl-2-pyrrolidinone (NMP) or hexamethylphosphoramide (HMPA) can be included.

The amine compound content can be greater than or equal to 1% by weight and less than or equal to 10% by weight with respect to the total weight of the aqueous solution. When satisfying the above-mentioned content, a target salt rejection and flux desired in the present disclosure can be secured.

The polyamide active layer can be prepared by coating the amine compound-comprising aqueous solution on the porous layer, and then bringing an organic solution comprising an acyl halide compound into contact therewith, and interfacial polymerizing the result.

The acyl halide compound is not limited as long as it can be used in polyamide polymerization, however, specific examples thereof can preferably include, as an aromatic compound having 2 to 3 carboxylic acid halides, one type selected from the compound group consisting of trimesoyl chloride, isophthaloyl chloride and terephthaloyl chloride, or a mixture of two or more types thereof.

The acyl halide compound content can be greater than or equal to 0.01% by weight and less than or equal to 0.5% by weight with respect to the total weight of the organic solution. When satisfying the above-mentioned content, a target salt rejection and flux desired in the present disclosure can be secured.

As an organic solvent included in the organic solution including an acyl halide compound, an aliphatic hydrocarbon solvent, for example, freons, hexane, cyclohexane and heptane having 5 to 12 carbon atoms, hydrophobic liquids that is not mixed with water such as alkane, for example, alkane having 5 to 12 carbon atoms, and a mixture thereof that is IsoPar (Exxon), ISOL-C (SK Chem), ISOL-G (Exxon) and the like can be used, however, the organic solvent is not limited thereto.

The organic solvent content can be from 95% by weight to 99.99% by weight with respect to the total weight of the acyl halide compound-comprising organic solution, however, the content is not limited thereto. When satisfying the above-mentioned content, a target salt rejection and flux desired in the present disclosure can be secured.

The polyamide active layer can have a thickness of 10 nm to 1000 nm, however, the thickness is not limited thereto. The thickness can be preferably from 300 nm to 500 nm. When the polyamide active layer satisfies the above-mentioned range, a target salt rejection and flux desired in the present disclosure can be secured.

In one embodiment of the present specification, the separation membrane element can further comprise a tricot between the separation membranes. The tricot has a fabric or knitted structure, and has a porous surface structure so as to create space for produced water to flow out.

In one embodiment of the present specification, the separation membrane element can be a spiral wound module.

When the separation membrane element is a spiral wound module, defects that can occur during a rolling process can be detected when manufacturing the separation membrane element compared to a flat sheet module.

In one embodiment of the present specification, the separation membrane element can comprise a case.

The case means a space in which the separation membrane element is stored, and is not particularly limited in the constitution and the manufacturing method, and general means known in the art can be employed without limit.

The separation membrane element of the present specification is not particularly limited in other constitutions and manufacturing methods as long as it comprises the separation membrane described above, and general means known in the art can be employed without limit.

In one embodiment of the present specification, the separation membrane element can comprise a center tube.

The center tube can be expressed as a tube, and the center tube performs a role of a path through which the permeated gas is introduced and discharged.

A shape of the center tube is not particularly limited, but is preferably located at the center of the separation membrane element. In addition, the center tube can have one side surface open so that the introduced gas is discharged.

In one embodiment of the present specification, the center tube can include a plurality of pores, and when gas permeation progresses by the separation membrane element according to one embodiment of the present specification, the permeated gas is introduced into the center tube through the plurality of pores of the center tube, and then the introduced gas is discharged through the open one side surface of the center tube.

A material of the center tube is not particularly limited, and general materials known in the art can be used.

Hereinafter, the present disclosure will be described in more detail with reference to accompanying drawings.

FIG. 1 illustrates a mimetic diagram of the apparatus for detecting defects of a separation membrane element according to the present specification. The apparatus for detecting defects of a separation membrane element comprises a pressure vessel (5), a gas supply unit (1) and a gas discharge unit (2), and a measurement unit (3) measuring permeability of the separation membrane element by the gas discharged to the gas discharge unit (2). The apparatus for detecting defects of a separation membrane element can further comprise a gas supply source (feed), a supply line (11) connected to a gas supply section between the gas supply source (feed) and the pressure vessel (5), and an on-off value (12) installed on the supply line (11) to supply or block the gas supplied from the gas supply source (feed).

In addition, the apparatus for detecting defects of a separation membrane element can further comprise a pressure regulator (13) installed on the supply line (11) to regulate the pressure of the supplied gas, and a pressure gauge (4) observing the pressure of the supplied gas. The apparatus for detecting defects of a separation membrane element can comprise a discharge line (22) connected between the pressure vessel (5) and a measurement unit (3), such as a flow meter.

The measurement unit (3) can comprise a flow meter measuring permeability of the gas discharged to the gas discharge unit (2). In addition, the apparatus for detecting defects of a separation membrane element can comprise, as necessary, a fixing unit fixing the separation membrane element inside the pressure vessel. The fixing unit can further comprise a sealing unit (6) preventing the gas discharged from the center tube included in the separation membrane element from being leaked and discharged by being connected to the gas discharge unit. By comprising the sealing unit (6), cracks or micro gaps can be prevented in the apparatus for detecting defects of a separation membrane element.

When opening the on-off value (12) after supplying a gas from the gas supply source (feed) to the apparatus for detecting defects of a separation membrane element, the gas is supplied along the supply line (11). The pressure herein can be adjusted to a target pressure using the pressure regulator (13), and the regulated pressure can be identified through the pressure gauge (4). The supplied gas is introduced into the pressure vessel (5) and injected into the separation membrane element. The gas passing through the separation membrane element is collected in the center tube and discharged to the discharge unit (2). After that, the discharged air is injected to the flow meter that is the measurement unit (3) along the discharge line (22), and through the flow meter, permeability of the separation membrane element can be measured. The apparatus for detecting defects of a separation membrane element according to one embodiment of the present specification is not limited to the structure of FIG. 1, and additional constitutions can be further included.

FIG. 2 illustrates the separation membrane element according to the present specification. Defects of the manufactured separation membrane element can be detected by manufacturing a spiral wound separation membrane element having a diameter of 1.8 inch and a length of 12 inch using a water-treatment membrane, specifically, a reverse osmosis membrane. The separation membrane element comprises a center tube (40) at the center. In the center tube (40), gas supplied from the supply unit of the apparatus for detecting defects of a separation membrane element described above is collected after permeating the separation membrane element, and the collected gas is discharged to the discharge unit of the apparatus for detecting defects of a separation membrane element through one side surface of the center tube (40).

FIG. 3 illustrates a gas flow into the separation membrane when supplying a gas to the cross section of the separation membrane according to one embodiment of the present specification. When supplying a gas to the apparatus for detecting defects of a gas separation membrane element of present specification, the supplied gas consecutively permeates an active layer (300), a second porous support (200) and a first porous support (100) of the separation membrane, and collected along the tricot included in the separation membrane.

FIG. 4 illustrates introducing raw water to the separation membrane according to one embodiment of the present specification instead of a gas. Specifically, FIG. 4 illustrates the separation membrane consecutively provided with a first porous support (100), a second porous support (200) and an active layer (300). Brine (400) is introduced to the active layer (300), produced water (500) is discharged through the first porous support (100), and concentrated water (600) is discharged outside failing to pass the active layer (300).

FIG. 5 illustrates introducing raw water to the separation membrane element according to one embodiment of the present specification. Specifically, the separation membrane element is formed comprising a center tube (40), a feed spacer (20), a separation membrane (10), a tricot filtration channel (30) and the like. When flowing raw water to the separation membrane element, the raw water is introduced through the feed spacer (20) in the separation membrane element. One or more of the separation membranes (10) are extended in an outer side direction from the center tube (40), and wound around the center tube (40). The feed spacer (20) forms a path through which raw water is introduced from the outside, and performs a role of maintaining a gap between one separation membrane (10) and another separation membrane (10). For this, the feed spacer (20) is in contact with the one or more separation membranes (10) on the upper side and the lower side, and wound around the center tube (40). The tricot filtration channel (30) generally has a fabric-type structure, and performs a role of a flow path creating space through which water purified through the separation membrane (10) flows. The center tube (40) is located at the center of the separation membrane element, and performs a role of a path through which filtered water is introduced and discharged. Herein, it is preferred to form a pore having a certain size on the outer side of the center tube (40) so as to introduce the filtered water, and it is preferred to form one or more pores.

EXAMPLES

Hereinafter, the present specification will be described in detail with reference to examples in order to specifically describe the present specification. However, examples according to the present specification can be modified to various different forms, and the scope of the present specification is not construed as being limited to the examples described below. The examples of the present specification are provided in order to more fully describe the present specification to those having average knowledge in the art.

Preparation Example

Manufacture of Apparatus for Detecting Defects of Separation Membrane Element

As a porous layer, a coating layer (polysulfone layer) was coated to a thickness of 60 μm on a non-woven fabric (polyethylene terephthalate) having a thickness of 100 μm. The coating solution of the polysulfone layer was a homogeneous liquid obtained by introducing 15% by weight of a polysulfone solid to 85% by weight of a dimethylformamide solvent and stirring the result for 12 hours at 80° C. to 85° C. As a coating method, a die coating method was used.

After that, a polyamide active layer was formed on the porous support using an interfacial polymerization reaction of m-phenylenediamine (m-PD) and trimesoyl chloride (TMC).

Specifically, an aqueous solution layer was formed on the porous support using an aqueous solution including 5% by weight of m-phenylenediamine. Then, an organic solution including 0.2% by weight of trimesoyl chloride (TMC) and 98% by weight of Isopar-G, an organic solvent, was coated on the aqueous solution layer, and the result went through an interfacial polymerization reaction to prepare a polyamide active layer having a thickness of 500 nm.

As a result, a separation membrane comprising a porous support and a polyamide active layer provided on the porous support was manufactured.

A spiral wound separation membrane element having a size of 1.8 inch diameter and 12 inch length (including center tube) was manufactured including the separation membrane 1 leaf of 1.2 m width and 30 cm height.

Using a stainless steel material, a pressure vessel having a diameter of 4 inch (101.6 mm) and a length of 15 inch (381 mm) capable of holding the separation membrane element manufactured above was prepared, and, by using a bubble flow meter (Gilibrator 2 of Sensidyne, LP) as a flow meter and a pressure gauge (digital pressure gauge of Sensys Co., Ltd.), an apparatus for detecting defects of a separation membrane element was manufactured.

EXPERIMENTAL EXAMPLE

Measurement of Permeability of Separation Membrane Element

Experimental Example 1

The manufactured separation membrane element was introduced to the apparatus for detecting defects of a separation membrane element, and fixed.

After supplying 50 psi (0.35 MPa) of compressed air to a supply unit, permeability of the manufactured separation membrane elements was measured in the flow meter, a measurement unit. The results are described in the following Table 1.

Specifically, using a bubble flow meter, permeability was measured in a total of 5 times within 3 minutes to 5 minutes under a condition of room temperature (25° C.) and 1 atm (101,325 Pa), and the calculated average value is described in the following Table 1.

Experimental Example 2

Permeability was measured in the same manner as in Experimental Example 1 except that the pressure of the compressed air was changed to 30 psi (0.2 MPa), and the results are described as Examples 1-1 and 1-2 in the following Table 2.

Evaluation on Performance of Separation Membrane Element

After measuring the permeability of the separation membrane element, performance of salt rejection and flux was evaluated under a condition of sodium chloride (NaCl) 250 g/L (250 ppm), 0.41 MPa (60 psi) and 15% recovery. The results are shown in the following Tables 1 and 2.

TABLE 1

| | Permeability (ccm) | Salt Rejection (%) | Flux (GPD) | Detection of Defects |
|---|---|---|---|---|
| Example 1 | 73.58 | 97.61 | 82 | Good Quality |
| Example 2 | 74.01 | 97.63 | 81 | Good Quality |
| Example 3 | 74.86 | 97.02 | 83 | Good Quality |
| Example 4 | 83.01 | 97.23 | 82 | Good Quality |
| Example 5 | 83.10 | 97.5 | 84 | Good Quality |
| Example 6 | 94.49 | 97.33 | 83 | Good Quality |
| Comparative Example 1 | 103.16 | 96.89 | 90 | Poor |
| Comparative Example 2 | 118.46 | 95.02 | 105 | Poor |
| Comparative Example 3 | 125.09 | 94.28 | 126 | Poor |

TABLE 1-continued

| | Permeability (ccm) | Salt Rejection (%) | Flux (GPD) | Detection of Defects |
|---|---|---|---|---|
| Comparative Example 4 | 130.52 | 94.02 | 133 | Poor |

TABLE 2

| | Permeability (ccm) | Salt Rejection (%) | Flux (GPD) | Detection of Defects |
|---|---|---|---|---|
| Example 1-1 | 41.94 | 97.61 | 82 | Good Quality |
| Example 1-2 | 42.93 | 97.63 | 81 | Good Quality |

In Tables 1 and 2, the permeability unit of ccm means cc/minute, and the flux unit of GPD means gallon/day. In addition, the 'good quality' in the detection of defects means defects being not detected in the separation membrane element, and the 'poor' means defects being detected in the separation membrane element.

According to the results of Tables 1 and 2, it was identified that defects were detected in the separation membrane element when the permeability of the separation membrane element was 95 ccm (0.095 L/min) or greater. In addition, it was identified that, when the salt rejection was 97% or less and the flux was 90 GPD (340 L/day) or greater in the evaluation on the performance of the separation membrane element, defects were detected in the separation membrane element and performance declined.

Hereinbefore, preferred embodiments of the present disclosure have been described, however, the present disclosure is not limited thereto, and various modifications can be made in the scope of the claims and the detailed descriptions of the disclosure, and these also fall within the category of the disclosure.

REFERENCE NUMERALS

1: Gas Supply Unit
11: Supply Line
12: On-Off Value
13: Pressure Regulator
2: Gas Discharge Unit
22: Discharge Line
3: Measurement Unit (Flow Meter)
4: Pressure Gauge
5: Pressure Vessel
6: Sealing Unit
10: Separation Membrane
20: Feed Spacer
30: Tricot Filtration Channel
40: Center Tube
100: First Porous Support
101: Porous Layer
200: Second Porous Support
300: Active Layer
400: Raw Water
500: Produced Water
600: Concentrated Water

The invention claimed is:
1. A method for detecting defects of a separation membrane element, the method comprising:

positioning the separation membrane element in a case inside a pressure vessel, the pressure vessel comprising a gas supply unit at one end of the pressure vessel and a gas discharge unit at the other end of the pressure vessel, wherein the separation membrane element comprises a center tube, one or more separation membranes wound around the center tube, and the case contains the one or more separation membranes wound around the center tube inside the case, and the pressure vessel is configured to accommodate the separation membrane element in the case, and the gas supply unit is provided so as to supply the gas between the center tube and the case, and the center tube is connected to the gas discharge unit; and supplying a gas comprising nitrogen, oxygen, and carbon dioxide to the gas supply unit of the pressure vessel at a pressure of 0.25 MPa to 0.45 MPa;

discharging gas passing through the separation membrane element and collected in the center tube to the gas discharge unit; and detecting defects in the separation membrane element by measuring a permeability of the separation membrane element using a flow meter attached to the gas discharge unit to measure an amount of the gas passing through the separation membrane element to the gas discharge unit, wherein a measurement of the amount of the gas passing through the separation membrane element to the gas discharge unit of 0.095 L/min (95 ccm) or greater indicates defects of the separation membrane element, wherein the one or more separation membranes comprise a porous layer and an active layer provided on the porous layer, and the active layer is a polyamide active layer formed by interfacial polymerization of an amine compound-comprising aqueous solution and an organic solution comprising an acyl halide compound; and the separation membrane element is a spiral wound module.

2. The method of claim 1, further comprising evaluating salt rejection of the separation membrane element under a condition of sodium chloride (NaCl) 250 g/L, 0.41 MPa, 25° C. and 15% recovery, wherein a salt rejection of the separation membrane element of 97% or less indicates defects of the separation membrane element.

3. The method of claim 1, further comprising evaluating flux of the separation membrane element under a condition of sodium chloride (NaCl) 250 g/L, 0.41 MPa, 25° C. and 15% recovery, wherein a flux of the separation membrane element of 340 L/day (90 GPD) or greater indicates defects of the separation membrane element.

4. An apparatus for detecting defects of a separation membrane element, the apparatus comprising:

a pressure vessel comprising a gas supply unit at one end of the pressure vessel and a gas discharge unit at the other end of the pressure vessel, wherein the separation membrane element comprises a center tube, one or more separation membranes wound around the center tube and a case containing the one or more separation membranes wound around the center tube inside the case, and the pressure vessel is configured to accommodate the separation membrane element in the case, and the gas supply unit is provided so as to supply the gas between the center tube and the case;

a sealing unit within the pressure vessel configured to receive an end of the center tube and connected to the gas discharge unit; and a measurement unit comprising a flow meter attached to the gas discharge unit by a discharge line, the measurement unit measuring permeability of the separation membrane element using a flow of gas passing through the separation membrane element and discharged to the gas discharge unit, wherein the one or more separation membranes comprise a porous layer and an active layer provided on the porous layer, and the active layer is a polyamide active layer formed by interfacial polymerization of an amine compound-comprising aqueous solution and an organic solution comprising an acyl halide compound; and the separation membrane element is a spiral wound module.

5. The apparatus of claim 4, wherein the gas discharge unit is provided to discharge the gas out of the pressure vessel when the gas passing through the separation membrane element is discharged from one end of the separation membrane element.

* * * * *